(12) United States Patent
Gou

(10) Patent No.: US 7,474,140 B2
(45) Date of Patent: Jan. 6, 2009

(54) APPARATUS FOR GENERATING ELEVATED VOLTAGE

(75) Inventor: Ja-Seung Gou, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 11 days.

(21) Appl. No.: 11/585,095

(22) Filed: Oct. 24, 2006

(65) Prior Publication Data
US 2007/0120590 A1 May 31, 2007

(30) Foreign Application Priority Data
Nov. 29, 2005 (KR) ...................... 10-2005-0115078

(51) Int. Cl.
*G05F 1/10* (2006.01)
(52) U.S. Cl. ..................................... 327/536
(58) Field of Classification Search ................. 327/539, 327/536, 589
See application file for complete search history.

(56) References Cited

U.S. PATENT DOCUMENTS

| | | | |
|---|---|---|---|
| 5,841,725 A | 11/1998 | Kang et al. | |
| 5,940,283 A * | 8/1999 | Mihara et al. | ................. 363/60 |
| 6,177,828 B1 | 1/2001 | Kang et al. | |
| 6,194,887 B1 * | 2/2001 | Tsukada | ...................... 323/315 |
| 6,300,820 B1 * | 10/2001 | Fotouhi et al. | ............... 327/536 |
| 6,400,211 B1 * | 6/2002 | Yokomizo et al. | ........... 327/536 |
| 6,400,216 B1 | 6/2002 | Kim et al. | |
| 6,853,567 B2 | 2/2005 | Kwon | |
| 7,064,529 B2 * | 6/2006 | Telecco | ....................... 323/267 |
| 7,102,423 B2 * | 9/2006 | Lee et al. | ...................... 327/536 |
| 7,245,176 B2 * | 7/2007 | Do | ............................... 327/536 |
| 7,276,960 B2 * | 10/2007 | Peschke | ...................... 327/536 |
| 7,292,090 B2 * | 11/2007 | Lee et al. | ..................... 327/536 |
| 7,307,897 B2 * | 12/2007 | Shin | ....................... 365/189.09 |
| 7,397,298 B2 * | 7/2008 | Tsukude | ...................... 327/535 |
| 2004/0183586 A1 | 9/2004 | Lee et al. | |

FOREIGN PATENT DOCUMENTS

| | | |
|---|---|---|
| JP | 09231749 | 9/1997 |
| JP | 2001095234 | 4/2001 |
| JP | 2001127254 | 5/2001 |
| JP | 2003030985 | 1/2003 |
| JP | 2003091991 | 3/2003 |
| KR | 1020030002508 | 1/2003 |

OTHER PUBLICATIONS

Taiwan Office Action Dated Sep. 15, 2008 for Taiwan Appl. No. 095137948.

* cited by examiner

*Primary Examiner*—Lincoln Donovan
*Assistant Examiner*—Hai L. Nguyen
(74) *Attorney, Agent, or Firm*—Venable LLP; Jeffri A. Kaminski

(57) ABSTRACT

Disclosed is an apparatus for generating an elevated voltage that compares an external supply voltage with a reference voltage, and performs voltage pumping using either the reference voltage or the external supply voltage as an input voltage of a pumping unit.

18 Claims, 4 Drawing Sheets

APPARATUS FOR GENERATING ELEVATED VOLTAGE

BACKGROUND

1. Technical Field

The present invention relates to an apparatus for generating an elevated voltage, and more particularly, to an apparatus for generating an elevated voltage that is capable of restricting a pumping level to a predetermined level without depending on an increase of an external supply voltage.

2. Related Art

Generally, an apparatus for generating an elevated voltage supplies a predetermined elevated voltage to circuits in the semiconductor memory that require a higher voltage than an external supply voltage. In order to compensate for a loss of a threshold voltage of transistors, the apparatus for generating an elevated voltage pumps and then uses the external supply voltage so as to have a level of an internal voltage $V_{CORE}$+a threshold value Vth+an allowance value a or the internal voltage $V_{CORE}$+the threshold value Vth+a substrate bias voltage $|V_{BB}|$+an allowance value a.

The apparatus for generating an elevated voltage is mainly used in a word line driver, an output buffer or the like. In order that during an active operation, after a word line is selected, data is transmitted through a cell transistor without a charge loss, it is required that the apparatus for generating an elevated voltage have an elevated voltage equal to the internal voltage $V_{CORE}$+the threshold value Vth+the substrate bias voltage $|V_{BB}|$+the allowance value a.

FIG. 1 is a diagram illustrating a conventional elevated voltage generating apparatus.

As shown in FIG. 1, the elevated voltage generating apparatus includes a potential detecting unit 10 to which an output voltage $V_{PP}$ of a pumping unit 14 is fed back and which compares the output voltage of the pumping unit 14 with a prescribed voltage so as to output the comparison result DET_ENABLE; an oscillation unit 12 that is connected to the potential detecting unit 10 and outputs an oscillation signal OSC for cyclically controlling a pumping operation; and the pumping unit 14 that pumps an external supply voltage $V_{DD}$ in response to the pulse signal OSC outputted by the oscillation unit 12 and outputs the pumping voltage $V_{PP}$.

In the elevated voltage generating apparatus shown in FIG. 1, the pumping unit 14 pumps the external supply voltage $V_{DD}$ in response to the pulse signal OSC outputted by the oscillation unit 12. In this case, the output voltage $V_{PP}$ of the pumping unit 14 is fed back to the potential detecting unit 10. When the pumping voltage level is not more than a prescribed voltage level, the oscillation unit 12 becomes enabled by the output signal DET_ENABLE of the potential detecting unit 10 and thus a pumping operation is performed. When the pumping voltage level is not less than the prescribed voltage level, the oscillation unit 12 becomes disabled by the output signal DET_ENABLE of the potential detecting unit 10 and thus a pumping operation is not performed.

FIG. 2 is a diagram illustrating an example of the pumping unit shown in FIG. 1.

As shown in FIG. 2, the conventional pumping unit 14 includes an inverter IV that is driven by a first control signal VIN1 generated by the output signal OSC of the oscillation unit 12 and that outputs an external supply voltage $V_{DD}$, a first capacitor C1 that charges the external supply voltage $V_{DD}$ outputted by the inverter IV, a MOS transistor P1 that is connected between the first capacitor C1 and the output terminal and that is driven by a second control signal VIN2 generated by the output signal OSC of the oscillation unit 12, and a second capacitor C2 that is connected between the output terminal and a ground terminal $V_{SS}$.

In this case, each of the first control signal VIN1 and the second control signal VIN2 is a non-overlap pulse, and the first control signal VIN1 has a narrower pulse width than the second control signal VIN2.

At an initial state, in a state in which the first control signal VIN1 is a low level and the second control signal VIN2 is a high level, the first capacitor C1 is charged with an external supply voltage level, and then, when the first control signal VIN1 and the second control signal VIN2 become a high level, a voltage of 0 V is outputted by the output terminal.

Then, when the first control signal VIN1 is shifted from a high level to a low level and the second control signal VIN2 is shifted from a high level to a low level, a voltage charged in the first capacitor C1 is added to the external supply voltage $V_{DD}$ that is supplied through an inverter IV, and a voltage of about $V_{DD}*2$ is outputted to the output terminal so as to generate voltage pumping.

However, in the conventional elevated voltage generating apparatus, if the level of the external supply voltage $V_{DD}$ is increased, the pumping voltage is also increased. Therefore, an amount of consumed current is increased in proportion to the external supply voltage at the time of a pumping operation.

FIG. 3 is a graph illustrating an increase in an amount of consumed current due to an increase in supply voltage in the conventional elevated voltage generating apparatus.

As shown in FIG. 3, an amount of consumed current during the pumping operation is increased in proportion to an increase in an external supply voltage level.

As such, if an amount of consumed current is increased, a pumping voltage level exceeds a desired level, and thus the applied stress becomes stronger in memory cells or peripheral elements, thereby causing elements to fail. As a result, the reliability and yield are lowered.

SUMMARY

An aspect of the present invention provides an apparatus for generating an elevated voltage that is capable of restricting a pumping level to a predetermined level regardless of an increase in an external supply voltage.

Another aspect of the present invention provides an apparatus for generating an elevated voltage that is capable of restricting a pumping level to a predetermined level and reducing an amount of current consumed in a semiconductor memory.

According to an aspect of the invention, there is provided an apparatus for generating an elevated voltage that compares an external supply voltage with a reference voltage, and performs voltage pumping using either the reference voltage or the external supply voltage as an input voltage of a pumping unit.

In this case, the apparatus for generating an elevated voltage includes a supply potential detecting unit that compares the external supply voltage with the reference voltage and outputs a potential comparison signal; and a pumping control unit that is driven by the potential comparison signal, and supplies an output signal having a level of either the reference voltage or the external supply voltage as an input voltage of the pumping unit.

According to another aspect of the invention, an apparatus for generating an elevated voltage includes a potential detecting unit that detects a pumping voltage level; an oscillation unit that outputs an oscillation signal in response to a signal outputted by the potential detecting unit; and a pumping unit that selectively receives an external supply voltage or a reference voltage as an input voltage, and pumps the input voltage in response to the outputted oscillation signal so as to output the pumped voltage.

BRIEF DESCRIPTION OF THE DRAWINGS

The invention will be described with reference to the accompanying drawings, wherein like numbers reference like elements, in which.

DESCRIPTION OF EXEMPLARY EMBODIMENTS

Hereinafter, the preferred embodiments of the invention will be described in detail with reference to the accompanying drawings.

Figure 1:
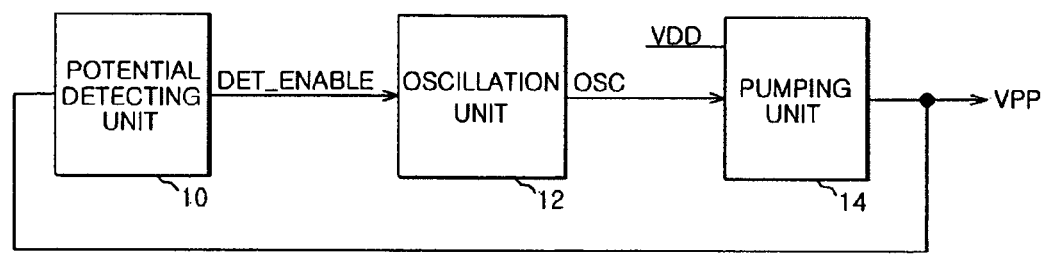
FIG. 1 (prior art) is a diagram illustrating a structure of a conventional elevated voltage generating apparatus.
Figure 2:
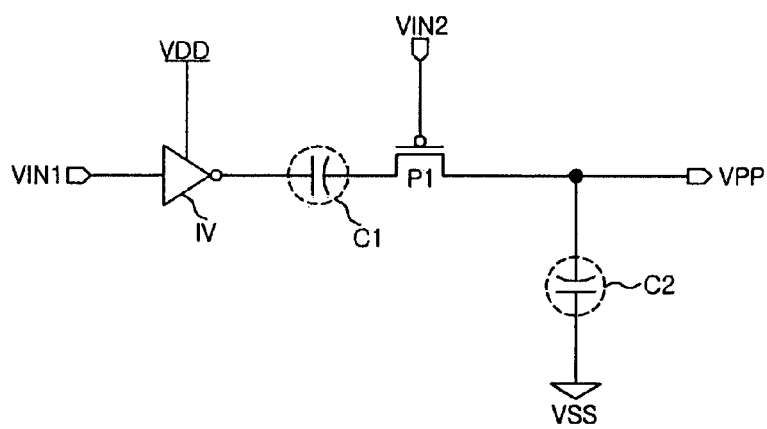
FIG. 2 (prior art) is a diagram illustrating an example of a pumping unit shown in FIG. 1.
Figure 3:
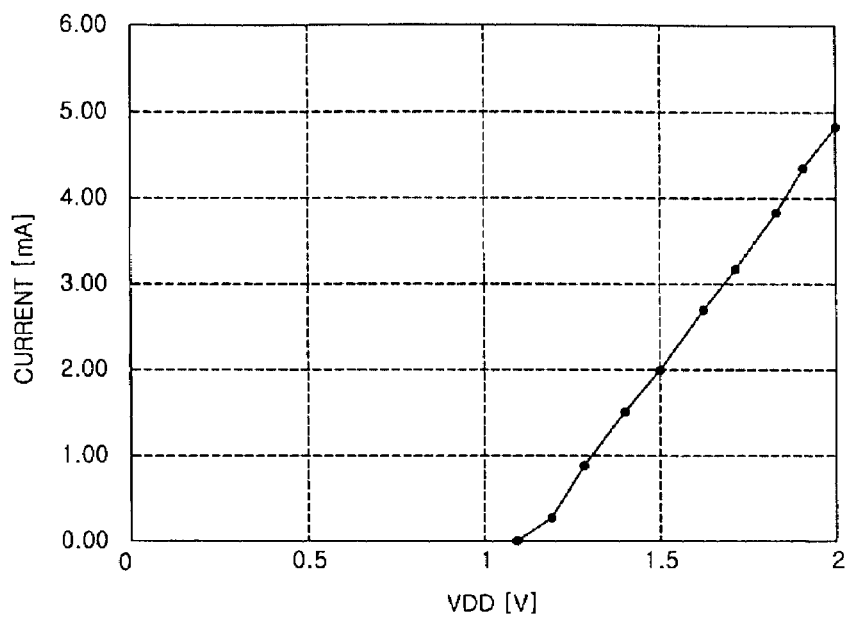
FIG. 3 (prior art) is a graph illustrating an increase in an amount of consumed current due to an increase in a supply voltage in a conventional elevated voltage generating apparatus.
Figure 4:
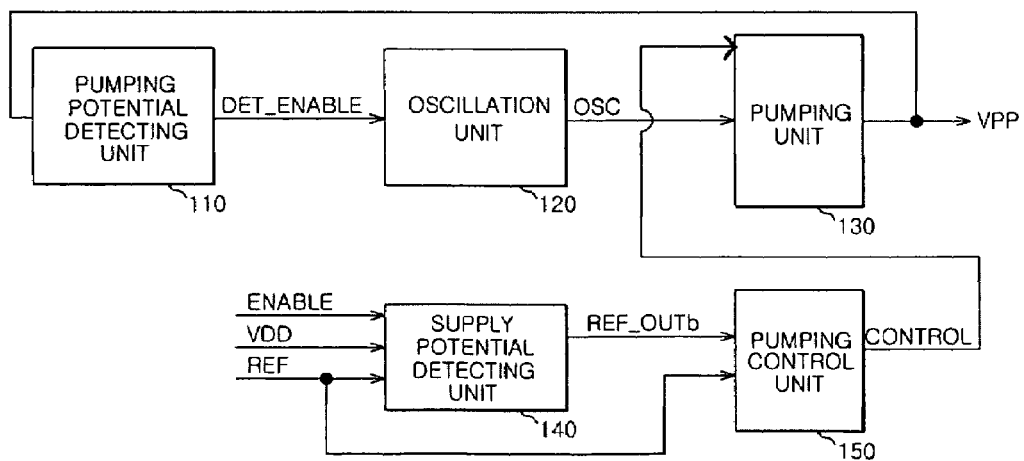
FIG. 4 is a diagram illustrating a structure of an elevated voltage generating apparatus according to an embodiment of the invention.

FIG. 4 is a diagram illustrating a structure of an elevated voltage generating apparatus according to an embodiment of the invention.

As shown in FIG. 4, the elevated voltage generating apparatus according to the embodiment of the invention includes a supply potential detecting unit 140 that is driven by an enable signal ENABLE, and compares an external supply voltage $V_{DD}$ with a reference voltage REF and outputs a potential comparison signal REF_OUTb of a low or high level in accordance with the comparison result; a pumping control unit 150 that outputs an output signal CONTROL applied with the external supply voltage $V_{DD}$ or the reference voltage REF as an input voltage of a pumping unit 130 in response to the potential comparison signal REF_OUTb outputted by the supply potential detecting unit 140; a pumping potential detecting unit 110 to which an output voltage $V_{PP}$ of the pumping unit 130 is fed back and which compares the output voltage of the pumping unit 130 with a prescribed voltage so as to output the comparison result DET_ENABLE; an oscillation unit 120 that is connected to the pumping potential detecting unit 110 and outputs a pulse signal OSC for cyclically controlling a pumping operation; and a pumping unit 130 that pumps a driving voltage CONTROL inputted by the pumping control unit 150 in response to the pulse signal OSC outputted by the oscillation unit 120 and outputs a pumping voltage $V_{PP}$. The pumping unit 130 in one embodiment of the invention is a charge pump or other device for producing an elevated voltage.

In this case, the supply potential detecting unit 140 generates the output signal REF_OUTb of a low level when the external supply voltage $V_{DD}$ is lower than the reference voltage REF, and generates the output signal REF_OUTb of a high level when the external supply voltage $V_{DD}$ is higher than the reference voltage REF.

In addition, in response to the output signal REF_OUTb of the supply potential detecting unit 140, the pumping control unit 150 generates an output signal CONTROL that is applied with the external supply voltage $V_{DD}$ when the external supply voltage $V_{DD}$ is lower than the reference voltage REF (for example, the potential comparison signal REF_OUTb is a low level), and generates an output signal CONTROL that is applied with the reference voltage REF when the external supply voltage $V_{DD}$ is higher than the reference voltage REF (for example, the potential comparison signal REF_OUTh is a high level).

Figure 5A:
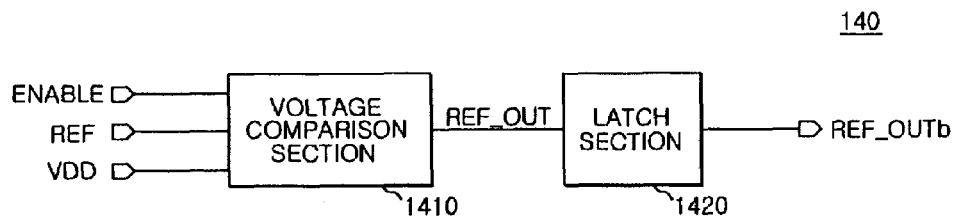
FIG. 5A is a block diagram illustrating a supply potential detecting unit shown in FIG. 4
Figure 5B:
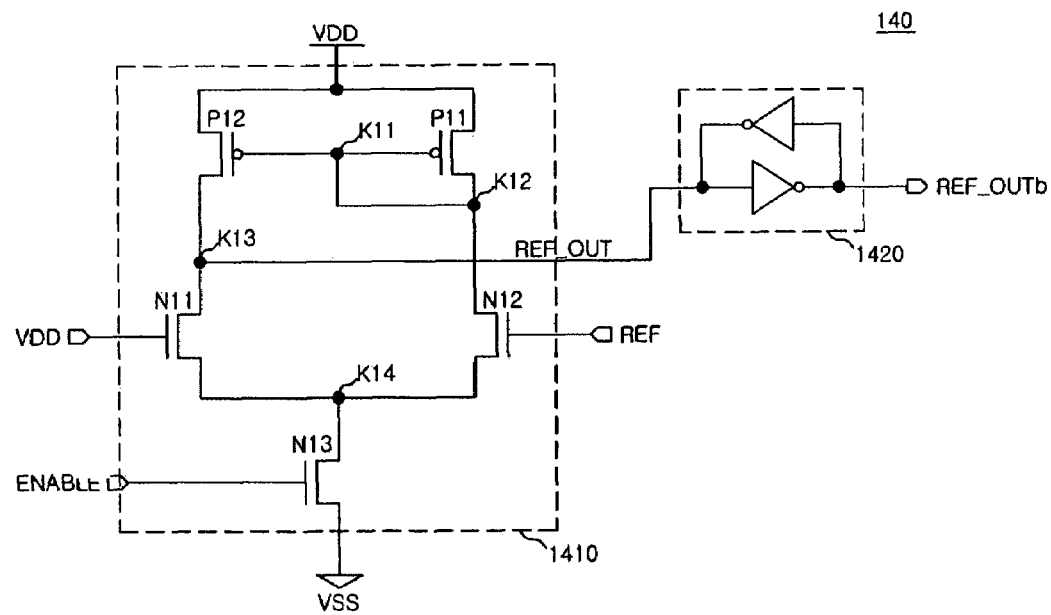
FIG. 5B is a circuit diagram illustrating a detailed structure of a supply potential detecting unit shown in FIG. 4.

FIG. 5A is a block diagram illustrating the supply potential detecting unit shown in FIG. 4, and FIG. 5B is a circuit diagram illustrating a detailed structure of the supply potential detecting unit shown in FIG. 4.

As shown in FIG. 5A, the supply potential detecting unit 140 according to the embodiment of the invention has a voltage comparison section 1410 that is driven when the enable signal ENABLE becomes enabled, uses the reference voltage REF as a first input signal and the external supply voltage $V_{DD}$ as a second input signal, and outputs a high-level or low-level signal REF_OUT according to the comparison result between the two input signals.

The enable signal ENABLE may be supplied as a pulse signal that outputs a level of the external supply voltage $V_{DD}$ according to any period. In this case, preferably, the voltage comparison section 1410 is connected to a latch section 1420 such that the latch section 1420 receives the output signal REF_OUT of the voltage comparison section 1410 and supplies it as the driving signal REF_OUTb of the pumping control unit 150, and even though the enable signal ENABLE becomes disabled, the state of the previous output signal can be maintained. As such, the enable signal ENABLE is supplied as the pulse signal such that the voltage comparison section 1410 operates only while the enable signal ENABLE becomes enabled, and if the enable signal becomes disabled, the previous state is maintained by the latch section 1420 such that an amount of consumed current is prevented from increasing.

The above will be described in detail with reference to FIG. 5B. The voltage comparison section 1410 of the supply potential detecting unit 140 according to the embodiment of the invention may be composed of a differential amplifier that is driven when the enable signal ENABLE becomes enabled, uses the reference voltage REF as the first input signal and the external supply voltage $V_{DD}$ as the second input signal, and outputs the comparison result between the two input signals. That is, the voltage comparison section 1410 includes a first MOS transistor P11 that is driven by a signal applied to a first node K11 and connected between the external supply voltage input terminal $V_{DD}$ and the second node K12, a second MOS transistor P12 that is driven by a signal applied to the first node K11 and connected between the external supply voltage input terminal $V_{DD}$ and the third node K13, a third MOS transistor N11 that is driven by the external supply voltage $V_{DD}$ and connected between the third node K13 and the fourth node K14, a fourth MOS transistor N12 that is driven by the reference voltage REF and connected between the second node K12 and the fourth node K14, and a fifth MOS transistor N13 that is driven by the enable signal ENABLE and connected between the fourth node K14 and the ground terminal $V_{SS}$.

In addition, the output signal REF_OUT of the third node K13 is inputted to the latch section 1420, and the output signal REF_OUTb of the latch section 1420 is supplied as the driving signal of the pumping control unit 150.

In this case, preferably, each of the first and second MOS transistors P11 and P12 is a P-type MOS transistor, and each of the third to fifth MOS transistors N11, N12, and N13 is an N-type MOS transistor.

The voltage comparison section 1410 shown in FIGS. 5A and 5B is driven when the enable signal ENABLE becomes enabled to a high level, and the reference voltage REF can be flexibly set according to a desired pumping level.

When the enable signal ENABLE for driving the supply potential detecting unit 140 becomes active, the reference voltage REF and the external supply voltage $V_{DD}$ are applied. In this case, when the level of the external supply voltage $V_{DD}$ is lower than the level of the reference voltage REF, a potential at the drain terminal of the first MOS transistor P11, that is, a potential at the second node K12 becomes a low level, while a potential at the drain terminal of the second MOS transistor P12, that is, a potential at the third node K13 becomes a high level, and the output signal of the latch section 1420, that is, a potential comparison signal REF_OUTb becomes a low level. In contrast, when the level of the external supply voltage $V_{DD}$ is higher than the level of the reference voltage REF, a potential at the second node K12 becomes a high level, while a potential at the third node K13 becomes a low level, and the output signal of the latch section 1420, that is, a potential comparison signal REF_OUTb becomes a high level.

On the other hand, when the enable signal ENABLE becomes non-active, the fifth MOS transistor N13 is turned off, and the supply potential detecting unit 140 becomes disabled. In this case, the previous output signal is maintained until the enable signal ENABLE is shifted from a low level to a high level again by the latch section 1420.

Figure 6A:
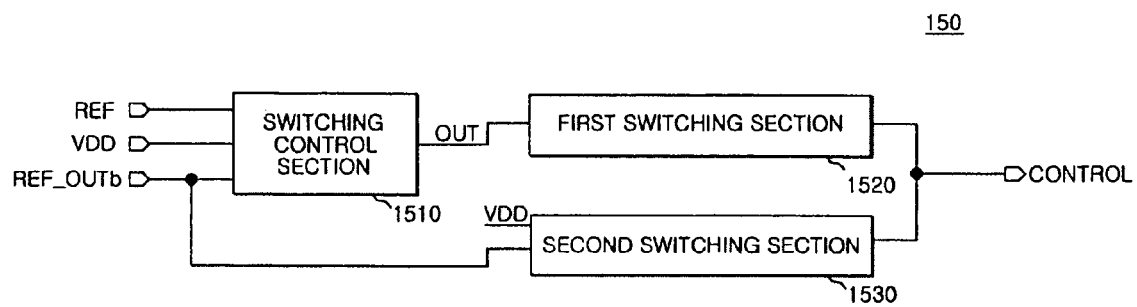
FIG. 6A is a block diagram illustrating a pumping control unit shown in FIG. 4.
Figure 6B:
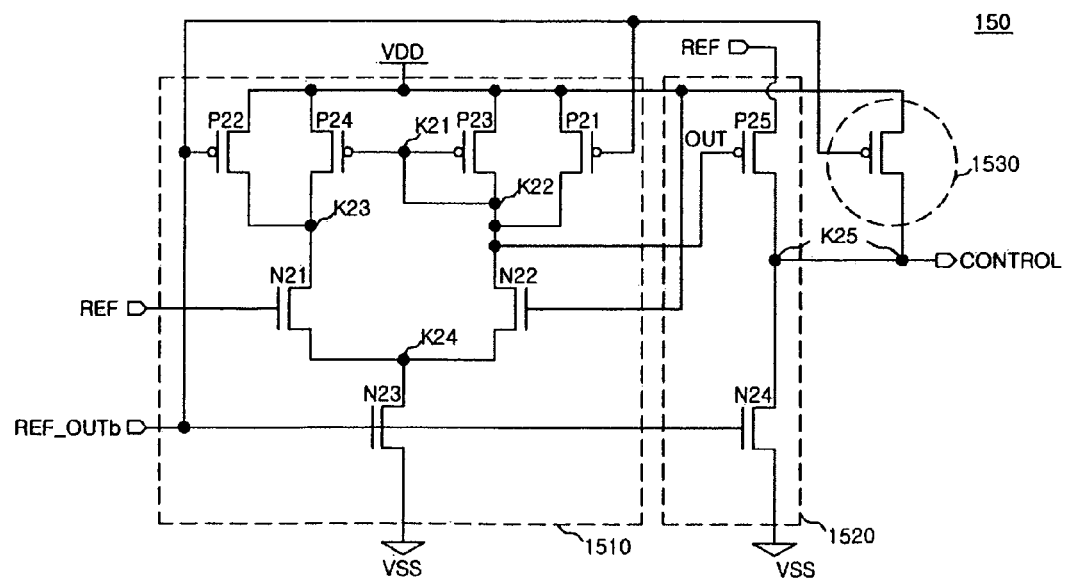
FIG. 6B is a circuit diagram illustrating a detailed structure of a pumping control unit shown in FIG. 4.

FIG. 6A is a block diagram illustrating the pumping control unit shown in FIG. 4, and FIG. 6B is a circuit diagram illustrating a detailed structure of the pumping control unit shown in FIG. 4.

As shown in FIG. 6A, the pumping control unit 150 according to the embodiment of the invention includes a switching control section 1510 that is driven by the potential comparison signal REF_OUTb outputted by the supply potential detecting unit 140, uses the reference voltage REF as a first input signal and the external supply voltage $V_{DD}$ as a second input signal, and outputs a signal according to the comparison result between the first and second input signals; a first switching section 1520 that is driven by the output signal OUT of the switching control section 1510 and supplies the reference voltage as the input voltage CONTROL of the pumping unit 130; and a second switching section 1530 that is driven by the potential comparison signal REF_OUTb and supplies the external supply voltage $V_{DD}$ as the input voltage CONTROL of the pumping unit 130.

The above will be described in detail with reference to FIG. 6B. The switching control section 1510 of the pumping control unit 150 according to the embodiment of the invention may be composed of a differential amplifier that is driven when the potential comparison signal REF_OUTb becomes enabled, uses the reference voltage REF as the first input signal and the external supply voltage $V_{DD}$ as the second input signal, and outputs the comparison result between the two input signals. That is, the switching control section 1510 includes a first MOS transistor P23 that is driven by a voltage applied to a first node K21 and connected between the external supply voltage input terminal $V_{DD}$ and the second node K22, a second MOS transistor P24 that is driven by a voltage applied to the first node K21 and connected between the external supply voltage input terminal $V_{DD}$ and the third node K23, a third MOS transistor P22 that is driven by the potential comparison signal REF_OUTb and connected between the external supply voltage input terminal $V_{DD}$ and the third node K23, a fourth MOS transistor P21 that is driven by the potential comparison signal REF_OUTb and connected between the external supply voltage input terminal $V_{DD}$ and the second node K22, a fifth MOS transistor N21 that is driven by the reference voltage REF and connected between the third node K23 and the fourth node K24, a sixth MOS transistor N22 that is driven by the external supply voltage $V_{DD}$ and connected between the second node K22 and the fourth node K24, and a seventh MOS transistor N23 that is driven by the potential comparison signal REF_OUTb and connected between the fourth node K24 and the ground terminal $V_{SS}$. The second node K22 corresponds to an output terminal OUT.

In this case, preferably, each of the first to fourth MOS transistors P23, P24, P22, and P21 is a P-type MOS transistor, and each of the fifth to seventh MOS transistors N21, N22, and N23 is an N-type MOS transistor. In particular, the first and second MOS transistors P23 and P24, and the fifth and sixth MOS transistors N21 and N22 are transistors having the same threshold voltage, respectively.

The switching control section 1510 is driven when the potential comparison signal REF_OUTb is a high level, that is, when the external supply voltage $V_{DD}$ is higher than the reference voltage REF, each of the first and second MOS transistors P23 and P24 acts as a resistance component of equal resistance, and equal currents flow through the fifth and sixth MOS transistors N21 and N22. Therefore, the low-level voltage is outputted to the output terminal OUT when the external supply voltage $V_{DD}$ is higher than the reference voltage REF.

The first switching section 1520 includes an eighth MOS transistor P25 that is driven by the output signal OUT of the switching control section 1510 and connected between the reference voltage input terminal REF and the fifth node K25, and a ninth MOS transistor N24 that is driven by the potential comparison signal REF_OUTb and connected between the fifth node K25 and the ground terminal $V_{SS}$. When the potential comparison signal REF_OUTb becomes a high level, the signal CONTROL having the same voltage level as the reference voltage REF is outputted as the input voltage of the pumping unit 130.

In this case, the eighth MOS transistor P25 may be a P-type MOS transistor, and the ninth MOS transistor N24 may be an N-type MOS transistor.

In addition, when the potential comparison signal REF_OUTb becomes a low level, that is, when the switching control section 1510 becomes disabled, the second switching section 1530 is driven, and outputs the external supply voltage $V_{DD}$ to the output terminal CONTROL so as to supply it as the input voltage of the pumping unit 130. The second switching section 1530 may be composed of a tenth MOS transistor that is driven by the potential comparison signal REF_OUTb and connected between the external supply voltage input terminal $V_{DD}$ and the output terminal CONTROL.

The operation of the elevated voltage generating apparatus according to the embodiment of the invention will now be described with reference to FIGS. 5A, 5B, 6A and 6B.

First, in order to prevent the external supply voltage $V_{DD}$ becoming high and thus the current being excessively consumed at the time of the voltage pumping, the voltage comparison section 1410 of the supply potential detecting unit 140 compares the external supply voltage $V_{DD}$ with the reference voltage REF. At this time, when the external supply voltage $V_{DD}$ is higher than the reference voltage REF, the voltage comparison section 1410 of the supply potential detecting unit 140 outputs the potential comparison signal REF_OUTb of the high level through the latch section 1420.

The potential comparison signal REF_OUTb is used as a driving signal of the pumping control unit 150. When the potential comparison signal REF_OUTb becomes a high level, the switching control section 1510 of the pumping control unit 150 is driven, and supplies the driving signal CONTROL having the same voltage level as the reference voltage REF to the pumping unit 130 through the first switching section 1520.

That is, when the external supply voltage $V_{DD}$ is higher than the reference voltage REF, the pumping unit 130 does not pump the external supply voltage $V_{DD}$, and pumps the reference voltage REF.

As described above, in order to prevent that the external supply voltage $V_{DD}$ becoming high and thus the current being excessively consumed at the time of the voltage pumping, the voltage comparison section 1410 of the supply potential detecting unit 140 compares the external supply voltage $V_{DD}$ with the reference voltage REF. At this time, when the external supply voltage $V_{DD}$ is lower than the reference voltage REF, the voltage comparison section 1410 of the supply potential detecting unit 140 outputs the potential comparison signal REF_OUTb of the low level through the latch section 1420.

The potential comparison signal REF_OUTb is used as a driving signal of the pumping control unit 150. When the potential comparison signal REF_OUTb becomes a low level, the switching control section 1510 of the pumping control unit 150 becomes disabled and stops operation. Then, the second switching section 1530 is driven, and the external supply voltage $V_{DD}$ is supplied as an input voltage CONTROL of the pumping unit 130.

That is, when the external supply voltage $V_{DD}$ is lower than the reference voltage REF, the pumping unit 130 pumps the external supply voltage $V_{DD}$.

As such, according to the embodiments of the invention, in order to prevent the pumping voltage from increasing when the level of the external supply voltage $V_{DD}$ increases, and thus increasing the consumed current, even though the external supply voltage $V_{DD}$ of the high level is supplied, the pumping voltage of the predetermined level or less is generated, thereby reducing an amount of current consumed in a semiconductor memory.

It will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

According to the embodiments of the invention, even though the level of the external supply voltage increases, the pumping voltage level can be limited to a predetermined value, thereby reducing the amount of consumed current. Therefore, it is possible to reduce the stress applied to the essential elements due to the current increase, thereby improving the reliability and yield of the semiconductor memory.

Furthermore, the enable signal for adjusting the pumping level is used as a pulse signal having any cycle, and thus it is possible to reduce an amount of current consumed when the pumping level is adjusted.

What is claimed is:

1. An apparatus for generating a high voltage comprising:
a supple potential detecting unit that compares an external supply voltage with a reference voltage and outputs a potential comparison signal;
a pumping control unit that is driven by the potential comparison signal, and supplies an output signal having a level of either the reference voltage or the external supply voltage as an input voltage of a pumping unit; and
the pumping unit pumps the output signal from the pumping control unit.

2. The apparatus for generating a high voltage of claim 1, wherein the supply potential detecting unit includes:
a voltage comparison section that uses the reference voltage as a first input signal and the external supply voltage as a second input signal, and outputs the comparison result between the two input signals to the pumping control unit.

3. The apparatus for generating a high voltage of claim 2, wherein the supply potential detecting unit is driven in response to an enable signal, and
the enable signal is a pulse signal that outputs the external supply voltage level according to a predetermined cycle.

4. The apparatus for generating a high voltage of claim 2, wherein the supply potential detecting unit further includes:
a latch section that is connected to an output terminal of the voltage comparison section.

5. The apparatus for generating a high voltage of claim 2, wherein the voltage comparison section includes:
a first MOS transistor that is driven by a signal applied to a first node and that is connected between an input terminal of the external supply voltage and a second node;
a second MOS transistor that is driven by the signal applied to the first node and that is connected between the input terminal of the external supply voltage and a third node;
a third MOS transistor that is driven by the external supply voltage and that is connected between the third node and a fourth node;
a fourth MOS transistor that is driven by the reference voltage and that is connected between the second node and the fourth node; and
a fifth MOS transistor that is driven by the enable signal and that is connected between the fourth node and a ground terminal, and
a signal applied to the third node is outputted to the pumping control unit.

6. The apparatus for generating a high voltage of claim 5, wherein each of the first and second MOS transistors is a P-type MOS transistor.

7. The apparatus for generating a high voltage of claim 5, wherein each of the third to fifth MOS transistors is an N-type MOS transistor.

8. The apparatus for generating a high voltage of claim 1, wherein the pumping control unit includes:
a switching control section that is driven by the potential comparison signal outputted by the supply potential detecting unit, uses the reference voltage as a first input signal and the external supply voltage as a second input signal, and outputs a signal according to the comparison result between the first and second input signals;
a first switching section that is driven by the output signal of the switching control section, and supplies the reference voltage as an input voltage of the pumping unit; and
a second switching section that is driven by the potential comparison signal, and supplies the external supply voltage as an input voltage of the pumping unit.

9. The apparatus for generating a high voltage of claim 8, wherein the switching control section includes:
a first MOS transistor that is driven by a voltage applied to a first node and that is connected between an input terminal of the external supply voltage and a second node;
a second MOS transistor that is driven by the voltage applied to the first node and that is connected between the input terminal of the external supply voltage and a third node;
a third MOS transistor that is driven by the potential comparison signal and that is connected between the input terminal of the external supply voltage and the third node;
a fourth MOS transistor that is driven by the potential comparison signal and that is connected between the input terminal of the external supply voltage and the second node;
a fifth MOS transistor that is driven by the reference voltage and that is connected between the third node and a fourth node;
a sixth MOS transistor that is driven by the external supply voltage and that is connected between the second node and the fourth node; and
a seventh MOS transistor that is driven by the potential comparison signal and that is connected between the fourth node and a ground terminal, and
the second node is an output terminal.

10. The apparatus for generating a high voltage of claim 9, wherein each of the first to fourth MOS transistors is a P-type MOS transistor, and
the first and second MOS transistors have the same threshold voltage.

11. The apparatus for generating a high voltage of claim 9, wherein each of the fifth to seventh MOS transistors is an N-type MOS transistor, and
the fifth and sixth MOS transistors have the same threshold voltage.

12. The apparatus for generating a high voltage of claim 8, wherein the first switching section includes:

a first MOS transistor that is driven by the output signal of the switching control section and that is connected between an input terminal of the reference voltage and the first node; and
a second MOS transistor that is driven by the potential comparison signal and that is connected between the first node and a ground terminal.

13. The apparatus for generating a high voltage of claim 12, wherein the first MOS transistor is a P-type MOS transistor.

14. The apparatus for generating a high voltage of claim 12, wherein the second MOS transistor is an N-type MOS transistor.

15. The apparatus for generating a high voltage of claim 8, wherein the second switching section is a MOS transistor that is driven when the potential comparison signal becomes a low level, and that is connected between the input terminal and the output terminal of the external supply voltage.

16. The apparatus for generating a high voltage of claim 15, wherein the MOS transistor is a P-type MOS transistor.

17. An apparatus for generating a high voltage comprising:
a potential detecting unit that detects a pumping voltage level;
an oscillation unit that outputs an oscillation signal in response to an output signal of the potential detecting unit; and
a pumping unit that selectively receives an external supply voltage or a reference voltage as an input voltage, and pumps the input voltage in response to the outputted oscillation signal so as to output the pumped voltage.

18. The apparatus for generating a high voltage of claim 17, wherein the pumping unit is driven by a potential comparison signal obtained by comparing a level of the external supply voltage with a level of the reference voltage, and receives an output signal of a pumping control unit outputting a signal having a level of either the reference voltage or the external supply voltage as an input voltage.

* * * * *